April 3, 1945. H. H. GOTBERG 2,372,823
APPARATUS FOR BROACHING
Filed May 4, 1942 2 Sheets-Sheet 1
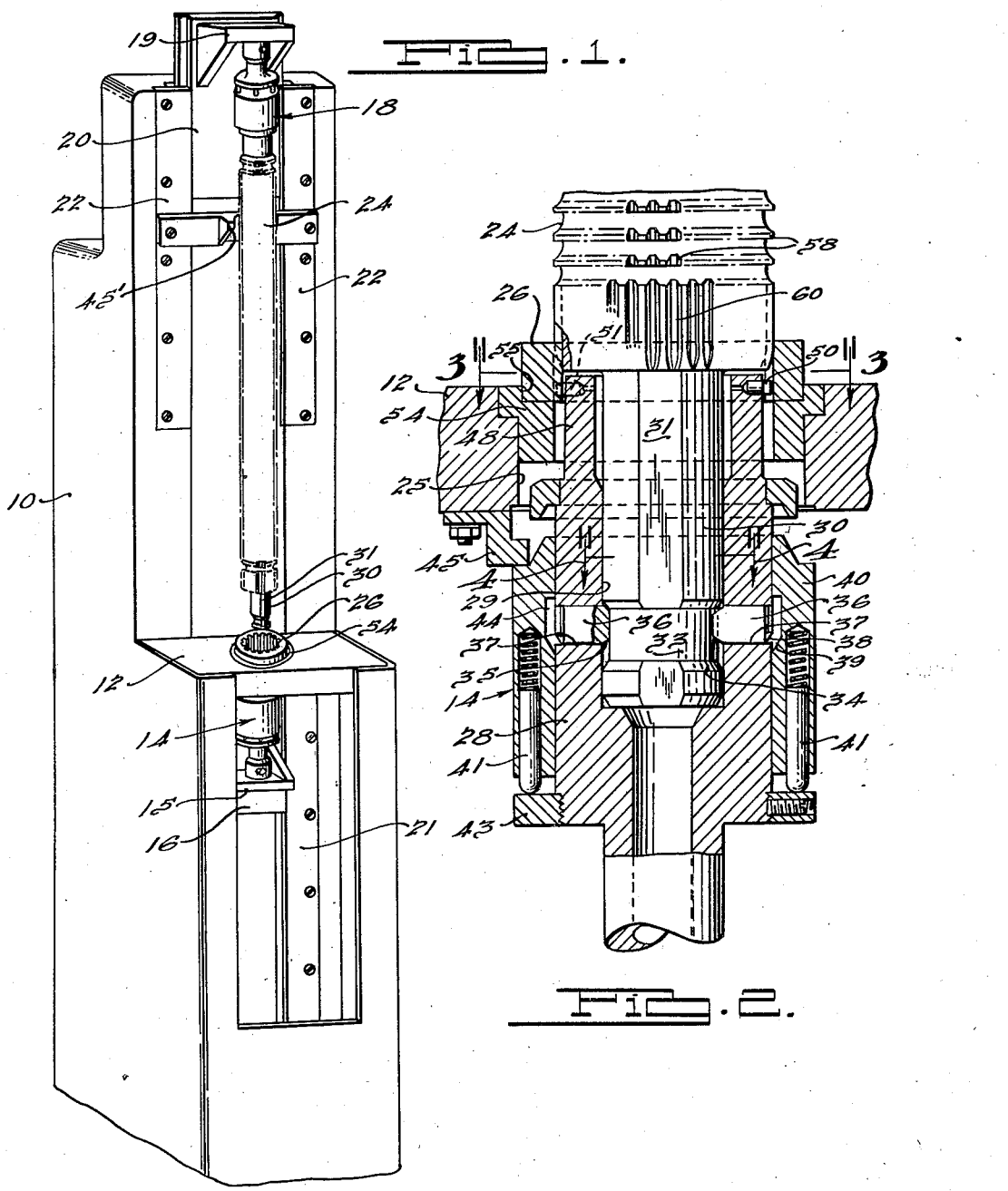
INVENTOR
Harry H. Gotberg.
BY
Harness, Dickey & Pierce
ATTORNEYS.

April 3, 1945. H. H. GOTBERG 2,372,823
APPARATUS FOR BROACHING
Filed May 4, 1942 2 Sheets-Sheet 2
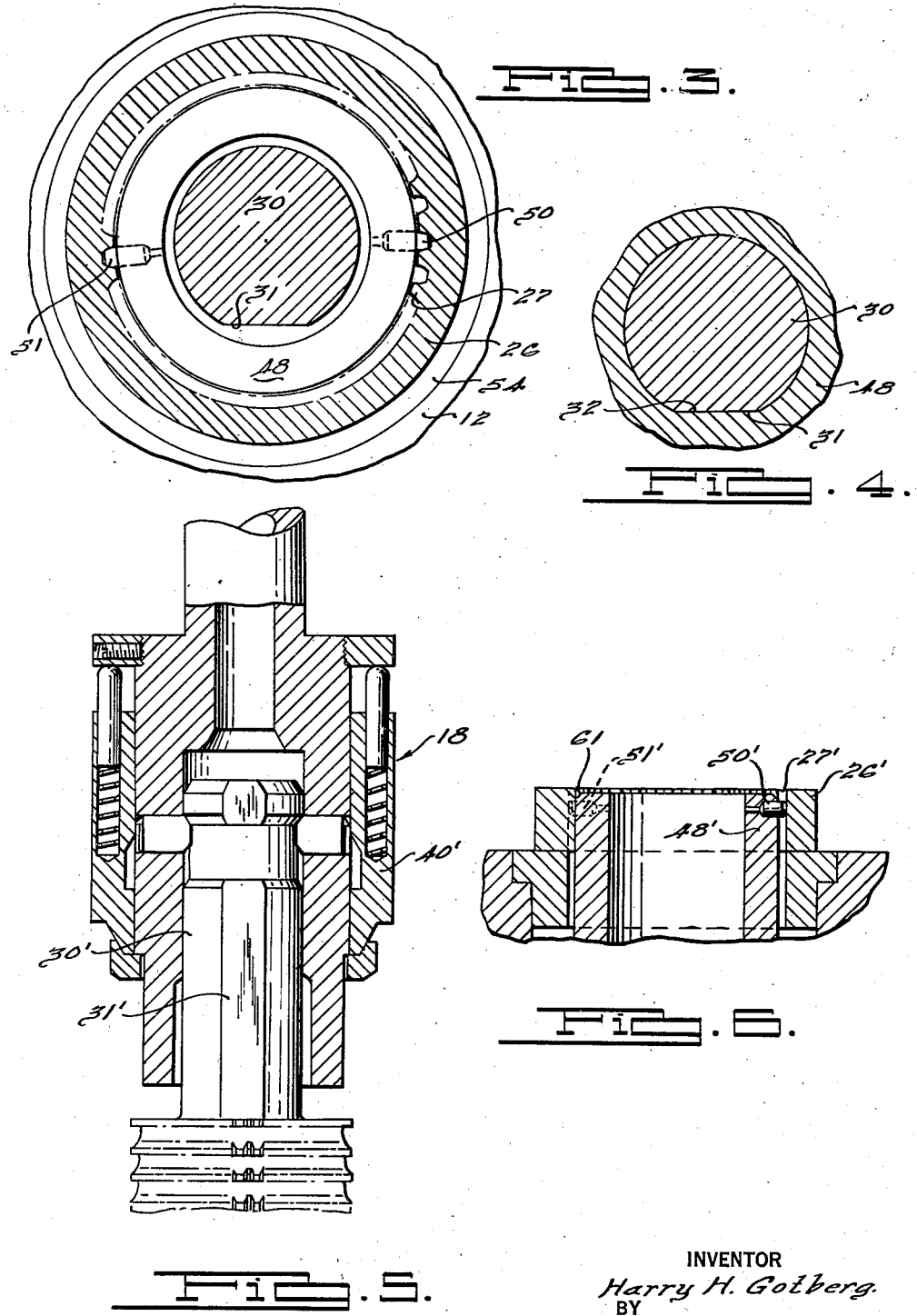
INVENTOR
Harry H. Gotberg.
BY
Harness, Dickey & Pierce.
ATTORNEYS.

Patented Apr. 3, 1945

2,372,823

UNITED STATES PATENT OFFICE 2,372,823

APPARATUS FOR BROACHING

Harry H. Gotberg, Detroit, Mich., assignor to Colonial Broach Company, Detroit, Mich., a corporation of Delaware Application May 4, 1942, Serial No. 441,578

10 Claims. (Cl. 90—33)

The present invention relates to apparatus for broaching an opening in a workpiece, and particularly to the means for locating the workpiece in proper juxtaposition to the path of travel of the broaching tool where that path of travel is in a generally downward direction.

In the operation of broaching machines in which the cutting stroke of the broach is in a downward direction, it is necessary to position the work upon the work table in proper alignment with the path of travel of the broach, and this is customarily done by a suitable work fixture which engages the exterior of the work and holds it in proper position. In some cases, however, difficulties are encountered in locating from the exterior surface of the workpiece, for example where the exterior surface of the workpiece is unfinished and irregular in form or where a non-circular opening is to be broached in the workpiece, so that it is necessary to properly locate the workpiece angularly about the axis of the broaching tool and the exterior of the workpiece is regular in contour so that it may be equally well positioned in several rotative positions in a fixture which engages the exterior.

Accordingly, it is the general object of the present invention to provide a novel means for locating workpieces in such a machine by a means which engages the walls of the opening to be machined by the broach.

A further object of the invention is to provide a locating means of the character mentioned which will automatically withdraw from engagement with the walls of the opening in order to permit passage of the broaching tool.

A further object of the invention is to provide work locating means associated with the work supporting table for locating the workpiece in alignment with the path of travel of the broaching tool in combination with work locating means engageable with the walls of the opening to be broached to locate the work angularly about the axis of the broaching tool.

Other objects which will become apparent from the following specification, the accompanying drawings and the appended claims, include the provision of work locating means of the type mentioned which are simple, inexpensive, and which permit ready insertion of the workpiece in the machine.

In the drawings, in which like numerals are used to designate like parts in the several views throughout:

Figure 1 is a general perspective view of one type of pull down broaching machine showing one application of the present invention;

Figure 2 is a vertical section through the work supporting table and broach pulling chuck of the machine showing the preferred form of work locating means;

Figure 3 is a transverse section taken on the line 3—3 of Figure 2;

Figure 4 is a transverse section taken on the line 4—4 of Figure 2;

Figure 5 is a longitudinal section through the broach handling chuck of the machine; and Figure 6 is a fragmentary vertical section corresponding to Figure 2 but showing a modified form of the work locating means in which all of the locating is done by engagement with the walls of the opening in the workpiece.

Referring to the drawings, the particular machine selected for illustration of the invention is a common form of pull down broaching machine having a main frame 10 provided with a work supporting table 12 adapted to support the work during the broaching operation. The machine has a pull chuck, indicated generally at 14, adapted to grip the lower end of the broach and pull it through the workpiece to perform the broaching operation. The chuck 14 is secured in any suitable manner to a bracket 15 which, in turn, is mounted upon a vertical slide 16. The machine is also provided with a broach handling chuck, indicated generally at 18, secured in any suitable manner to a bracket 19 mounted upon a vertically reciprocated slide 20. The slides 16 and 20 are mounted for vertical sliding movement in any suitable or conventional manner in ways 21 and 22, respectively, and are operated by suitable hydraulic cylinders.

The machine illustrated is of the so-called "shuttle broaching" type, in which the broach handling chuck 18 is first moved downward from the starting position illustrated in Figure 1 to insert the lower end of a broach 24 through the workpiece 26 and the opening 25 in the work supporting table 12 and into the pull chuck 14. Thereupon the hydraulic cylinder which controls the operation of the pull chuck 14 is identically actuated to move the pull chuck 14 downwardly and thereby draw the broach entirely through the work on its cutting stroke. This leaves the finished work resting freely on the work table, from which it may then be removed by the operator. Pull chuck 14 is then returned to its starting position, illustrated in Figures 1 and 2, which projects the upper end of the broach 24 into the handling chuck 18 whereupon the chuck 18 is actuated to withdraw the broach from the pull chuck and return it to the position shown in Figure 1.

The chucks, as hereinafter described in detail, have automatic means to lock and unlock the broach at the proper points in the cycle of operation. Any suitable means for actuating and controlling the actuation of the two chucks through the above mentioned cycle, such as hydraulic cylinders, control valves, pumps, etc., are provided in accordance with the usual practice.

The present invention relates to the work locating means which, in the preferred form of the invention best shown in Figure 2, is located partly upon the work supporting table and partly upon the pull chuck 14. The particular workpiece selected for illustration is in the form of a ring 26 having a circular periphery and preformed internal involute spline teeth 27. The broaching operation to be performed is a finishing operation on the sides of the internal spline teeth. It will be observed that with such a workpiece it would not be possible to properly locate the workpiece angularly about the axis of the broach by means engaging the circular periphery of the workpiece. The same difficulty would be encountered with other types of workpieces, as, for example, an internally splined spur gear having an even number of spur gear teeth and an odd number of internal spline teeth. Accordingly, in the preferred embodiment of Figure 2 means are provided for engaging the periphery of the workpiece to locate the workpiece in axial alignment with the broach while additional means mounted upon the pull chuck 14 engage the walls of the opening of the workpiece to locate the work in proper angular position with reference to the axis of the broach.

Referring to Figure 2, it will be seen that the pull chuck comprises a body 28 having an axial bore 29 adapted to receive the shank 30 at the lower end of the broach 24. As best shown in Figures 1, 2 and 4, the shank 30 of the broach is provided at one side with a flat surface 31, which cooperates with a correspondingly shaped flat surface 32 formed in the interior of bore 29 to fix the angular position of the broach 24 about its own axis with reference to the puller 14.

The shank 30 of the broach adjacent its lower end is provided with a peripheral groove 33 defining an inwardly inclined shoulder 34 adapted to co-operate with correspondingly inclined surfaces 35 on the inner ends of a plurality of locking dogs 36, which are slidable in radially extending bores 37 in the sides of the body 28 of the pull chuck. The locking dogs 36 are longer than the thickness of the walls of the body 28 and, in consequence, must project either inwardly into the bore 29 or outwardly beyond the periphery of body 28. The outer extremities of the dogs 36 are provided with an inclined surface 38 adapted to cooperate with the correspondingly inclined shoulder 39 formed on the interior of a sliding sleeve 40 which surrounds the body 28 of the shoulder. The sliding sleeve 40 is normally urged in an upward direction, as viewed in Figure 2, with respect to the body 28 by means of spring actuated plungers 41 mounted in axial extending bores in the sleeve 40 and bearing upon a ring 43 secured to the lower end of the body 28. In consequence of this arrangement, the sleeve 40 is normally urged upwardly into a position in which the shoulder 39 forces the locking dogs 36 into the groove 33 in the shank 30 of the broach, in which position the inner ends of the locking dogs are adapted to engage the shoulder 34 on the broach shank and lock the same against withdrawal from the puller during downward movement of the latter.

When the sleeve 40 is retracted against the action of spring pressed plungers 41 into the position shown in Figure 2, the locking dogs 36 are free to move outwardly and, consequently, the broach may be withdrawn from the puller. Upon such withdrawal, the shoulder 34 on the broach shank cams the locking dogs 36 outwardly into the interior groove 44 in the sleeve 40. Such retraction of the sleeve 40 is automatically effected when its shoulder reaches its uppermost or starting position, illustrated in Figures 1 and 2, by means of a lug 45 mounted on the underside of table 12, which lug engages the upper end of the sleeve 40 and prevents upward movement of the sleeve during the final upward movement of the body 28 of the puller 14.

In accordance with the present invention, the puller body 28 is provided with an upward tubular projection 48 which, in the uppermost position of the puller, projects through the opening 25 in the work supporting table 12 and into the opening in the workpiece 26.

In the particular embodiment illustrated in Figure 2, the outside diameter of the tubular projection 48 is slightly smaller than the inside diameter of the spline teeth 27. A pair of locating pins 50 and 51, shown best in Figures 2 and 3, are positioned in suitable radially extending bores in the projection 48 and project outwardly from the periphery of the tubular projection. The projecting extremities of the locating pins 50 and 51 have a contour such that they will fit between a pair of spline teeth 27. When the workpiece is placed on the work supporting table, the puller is in its uppermost position, shown in Figures 1 and 2, and, accordingly, the workman fits the workpiece over the tubular projection 48 and rotates it about the axis of the puller until the pins 50 and 51 pass into two of the spaces between the spline teeth. This insures that the workpiece will be in proper angular position with respect to the axis of the puller and broach to receive the teeth of the broach during the broach cutting operation.

In the embodiment of the invention illustrated in Figure 2, the work is located in alignment with the axis of the broach by means of a supporting ring 54, which is seated in the upper end of the table opening 25 and which is provided with an annular recess 55 adapted to fit the periphery of the workpiece.

It is apparent from the above that when the workman has placed the workpiece within the annular recess 55 of the supporting ring 54 the outer wall of the ring 54, in combination with the work locating pins 50 and 51, fix both the axial alignment and the angular position of the workpiece with reference to the axis of the broach. By reason of the fact that the work locating pins 50 and 51 are carried by the pull chuck 14, it is apparent that during the broach pulling operation they will be withdrawn from the opening in the workpiece and permit free passage of the broach.

In order to insure that the workpiece will not be angularly displaced between the time that the locating pins 50 and 51 move downwardly out of engagement with the walls of the opening in the workpiece and the time that the first broach cutting tooth 58 engages the work, there is provided upon the broach a plurality of pilot teeth 60, which are shaped to fit the spaces between the spline teeth 27 of the workpiece and which are provided with tapered lower ends to insure that they properly enter the spaces between the spline teeth.

As best shown in Figure 2, pilot teeth 60 are preferably so arranged that they enter the workpiece prior to the broach pulling operation. Figure 2 illustrates a position of the parts after the work has been placed in position and the broach 24 has been moved downward by the handling chuck 18 to project the lower shank 30 of the broach entirely into the pull chuck 14. It will be noted that in this position the pilot teeth 60 have already engaged the grooves between the spline teeth 27 and the workpiece 26. During the ensuing broach pulling operation, the puller 14 moves down. The first portion of this downward movement disengages the sleeve 40 from the lug 45, permitting the spring pressed plungers 41 to force the sleeve upwardly on the body 28 of the chuck and cause the cam surfaces 39 to force the locking dogs 36 into the groove 33 in the shank of the broach. During this initial travel the broach may or may not move downward, depending upon the friction forces acting upon it; but, in any event, upon completion of this initial movement the locking dogs 36 engage the shoulder 34 of the broach shank and positively pull the broach downward with the puller 14.

Since the pilot teeth 60 engage between the grooves of the spline teeth 27 prior to the time that the pins 50 and 51 leave the workpiece opening, there is no possibility of angular displacement of the work during the downward movement of the puller 14 and, consequently, the broach teeth 58 will properly enter the spaces between the spline teeth 27.

The broach handling chuck 18, as best shown in Figure 5, is identical in construction to the pull chuck 14 previously described and, therefore, need not be described in detail. It should be noted, however, that, like chuck 14, it should contain a flat surface adapted to co-operate with the flat surface 31' on the upper shank 30' of the broach to prevent rotation of the broach relative to the axis of the chuck.

When the handling chuck 18 reaches its lowermost position, in which the lower shank 30 of the broach is in the position illustrated in Figure 2 of the drawings, the sleeve 40' will have engaged a suitable lug 45' and will have been forced upwardly by that lug into broach releasing position against the action of the spring pressed plungers. Accordingly, the broach may thereafter be freely withdrawn by the pull head 14 at the beginning of the broach cutting stroke.

In the modified form of the invention illustrated fragmentarily in Figure 6, the machine is identical in construction to that illustrated and described in Figures 1 to 5, inclusive, except that the tubular projection 48' at the upper end of the body of the pull chuck is constructed to fit the inside diameter of the spline teeth 27' of the workpiece 26' and thus locate the workpiece in proper axial alignment with the broach. The tubular projection 48' is provided with work locating pins 50' and 51', which function to locate the work angularly with respect to the axis of the broach in the manner previously described. In this form of the invention it is unnecessary to provide means on the table, such as the annular recess 55 shown in Figure 2, for locating the work in axial alignment with the broach. The upper outer edge of the tubular projection 48' is preferably beveled at 61 to permit ready insertion of the workpiece over the projection.

It will be observed that in both forms of the invention the rotative position of the broach about its own axis is fixed with reference to the pull chuck at all times, even though the broach is supported entirely within the handling chuck 18, and that the angular position of the work when inserted over the tubular projection of the pull chuck is likewise fixed with reference to the pull chuck. Accordingly, the workpiece will always be in a position to receive the teeth of the broach.

It will be appreciated that while the particular embodiments of the invention illustrated are adapted for use in connection with a workpiece having a circular periphery and internal involute spline teeth, the invention may equally well be adapted for use in connection with other forms of workpieces. In fact, the invention is useful for broaching any form of opening in a workpiece, and is particularly useful in any case where its is difficult or not possible to locate entirely by means engaging the outside of the workpiece. It will be understood, of course, that the invention is not limited to the employment of work locating pins of the exact configuration of the pins 50 and 51, but that in each case the locating means must be shaped to fit the interior contour of the opening in the workpiece. Also, it will be appreciated that any number of locating pins may be used.

The invention is likewise not limited in its application to pull down machines, but may be employed with machines in which the broach is either pushed or pulled or both pushed and pulled during all or part of the broach cutting stroke.

What is claimed is:

1. In a broaching machine for broaching an opening in a workpiece, a work support adapted to sustain the work against the force exerted by the broaching operation and having an opening to permit passage of the broach, a broach handling chuck located on one side of the work support and movable toward and from the support in alignment with said opening, a broach pulling chuck located on the opposite side of the support for receiving the broach from the broach handling chuck and pulling it through the work, and means on the pulling chuck adapted to project into said opening in the workpiece to locate said workpiece with respect to the broach when the pulling chuck is located in proximity to said support, said last-named means being movable out of said workpiece opening when the pulling chuck performs its broach pulling operation.

2. In a broaching machine for broaching an opening in a workpiece by a downward movement of a broaching tool, a work table having an opening to permit passage of the broach and providing a support for the workpiece, a vertically movable chuck above the table adapted to support the broach and pass the same downward into the workpiece opening, a vertically movable pulling chuck below the table for receiving the broach from the first-mentioned chuck and pulling it through the work, and means on the pulling chuck adapted to project into said opening in the workpiece to locate said workpiece with respect to the broach when the pulling chuck is in its uppermost position, said last named means being movable out of said workpiece opening when the pulling chuck moves downwardly.

3. In a broaching machine for broaching a non-circular opening in a workpiece by a downward movement of a broaching tool, a work table having an opening to permit passage of the broach, means on the table for locating the workpiece in the path of travel of the broach, a vertically movable chuck above the table adapted to support the broach and pass the same downward into the workpiece opening, said chuck having means co-operating with the broach to hold the broach in a predetermined angular position about the broach axis, and movable means adapted to engage the walls of said non-circular opening in the workpiece to locate said workpiece in proper angular position with respect to the axis of the broach prior to engagement of the broach with the workpiece, said last named means being movable out of engagement with said walls during passage of the broaching tool through said opening.

4. In a pull down broaching machine of the shuttle type for broaching an opening in a workpiece, a work supporting table having an opening to permit passage of the broach, a vertically movable broach handling chuck above and in alignment with the table opening, a vertically movable broach puller below the table and in alignment with the table opening, and means on the puller adapted to project through the table opening and engage the walls of the opening in the workpiece to locate the workpiece prior to engagement of the broach with said walls.

5. In a pull down broaching machine for broaching a non-circular opening in a workpiece, a work supporting table having an opening for passage of the broach, a broach handling chuck mounted for reciprocation above said table opening, a broach pulling chuck mounted for reciprocation below said table opening, said chucks being coaxial and having means to hold a broach in predetermined angular position about its own axis when the broach is held by either of said chucks, and means on the pulling chuck adapted when the pulling chuck is in its upper position to project into the non-circular opening in the workpiece and locate said workpiece in proper position to receive the broach when it is passed down through the work by one or both of said chucks.

6. In a pull down broaching machine for broaching a non-circular opening in a workpiece, a work supporting table having an opening for passage of the broach, a broach handling chuck mounted for reciprocation above said table opening, a broach pulling chuck mounted for reciprocation below said table opening, said chucks being coaxial and having means to hold a broach in predetermined angular position about its own axis when the broach is held by either of said chucks, means on the table for locating a workpiece in alignment with the axis of the chucks, and means on the pulling chuck adapted when the pulling chuck is in its upper position to project into the non-circular opening in the workpiece and locate said workpiece angularly about the axis of the broach in proper position to receive the broach when it is passed down through the work by one or both of said chucks.

7. In a pull down broaching machine for broaching a non-circular opening in a workpiece, a broach for machining the walls of said non-circular opening, a work supporting table having an opening for passage of the broach, a broach handling chuck mounted for reciprocation above said table opening, a broach pulling chuck mounted for reciprocation below said table opening, said chucks being coaxial and having co-operating means on said broach and said chucks for holding the broach in predetermined angular position about its own axis when the broach is held by either of said chucks, and means on the pulling chuck adapted when the pulling chuck is in its upper position to project into the non-circular opening in the workpiece and locate said workpiece in proper position to receive the broach when it is passed down through the work by one or both of said chucks.

8. In a pull down broaching machine for broaching a non-circular opening in a workpiece, a broach for machining the walls of said non-circular opening, a work supporting table having an opening for passage of the broach, a broach handling chuck mounted for reciprocation above said table opening, a broach pulling chuck mounted for reciprocation below said table opening, said chucks being coaxial and having co-operating means on said broach and said chucks for holding the broach in predetermined angular position about its own axis when the broach is held by either of said chucks, means on the table for locating a workpiece in alignment with the axis of the chucks, and means on the pulling chuck adapted when the pulling chuck is in its upper position to project into the non-circular opening in the workpiece and locate said workpiece angularly about the axis of the broach in proper position to receive the broach when it is passed down through the work by one or both of said chucks.

9. In a pull down broaching machine for broaching a non-circular opening in a workpiece, a broach for machining the walls of said non-circular opening, a work supporting table having an opening for passage of the broach, a broach handling chuck mounted for reciprocation above said table opening, a broach pulling chuck mounted for reciprocation below said table opening, said chucks being coaxial and having co-operating means on said broach and said chucks for holding the broach in predetermined angular position about its own axis when the broach is held by either of said chucks, and means on the pulling chuck adapted when the pulling chuck is in its upper position to project into the non-circular opening in the workpiece and locate said workpiece in proper position to receive the broach when it is passed down through the work by one or both of said chucks, and pilot means on the broach adapted to engage the walls of said opening in the workpiece when the broach pulling operation begins but prior to disengagement of said means on the pulling chuck from said opening, said pilot means being operative to hold the workpiece in said proper angular position until the cutting teeth of the broach engage the work.

10. In a pull down broaching machine for broaching a non-circular opening in a workpiece, a broach for machining the walls of said non-circular opening, a work supporting table having an opening for passage of the broach, a broach handling chuck mounted for reciprocation above said table opening, a broach pulling chuck mounted for reciprocation below said table opening, said chucks being coaxial and having co-operating means on said broach and said chucks for holding the broach in predetermined angular position about its own axis when the broach is held by either of said chucks, means on the table for locating a workpiece in alignment with the axis of the chucks, and means on the pulling chuck adapted when the pulling chuck is in its upper position to project into the non-circular opening in the workpiece and locate said workpiece angularly about the axis of the broach in proper position to receive the broach when it is passed down through the work by one or both of said chucks, and pilot means on the broach adapted to engage the walls of said opening in the workpiece when the broach pulling operation begins but prior to disengagement of said means on the pulling chuck from said opening, said pilot means being operative to hold the workpiece in said proper angular position until the cutting teeth of the broach engage the work.

HARRY H. GOTBERG.